United States Patent
Miyashita

(10) Patent No.: US 6,972,822 B2
(45) Date of Patent: Dec. 6, 2005

(54) FIELD SEQUENTIAL LIQUID CRYSTAL DISPLAY APPARATUS USING ACTIVE MATRIX LIQUID CRYSTAL DISPLAY DEVICE

(75) Inventor: Takashi Miyashita, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 10/251,864

(22) Filed: Sep. 20, 2002

(65) Prior Publication Data

US 2003/0058399 A1    Mar. 27, 2003

(30) Foreign Application Priority Data

Sep. 26, 2001  (JP) .............................. 2001-294680

(51) Int. Cl.$^7$ ...................... G02F 1/1339; G02F 1/133; G02F 1/136
(52) U.S. Cl. ........................... 349/156; 349/36; 349/43
(58) Field of Search ..................... 349/42–44, 155–156, 349/61, 151, 36

(56) References Cited

U.S. PATENT DOCUMENTS 5,748,266 A * 5/1998 Kodate ........................ 349/39
6,151,004 A * 11/2000 Kaneko ....................... 345/88
6,320,639 B1 * 11/2001 Mori et al. .................. 349/155
6,445,437 B1 * 9/2002 Miyazaki et al. ........... 349/156
6,774,975 B2 * 8/2004 Ahn ............................ 349/156
2002/0140894 A1 * 10/2002 Morimoto .................... 349/156

FOREIGN PATENT DOCUMENTS

| JP | 10-48636 A | 2/1998 |
| JP | 2000-214826 A | 8/2000 |
| JP | 2000-298280 A | 10/2000 |
| KR | 1998-018383 A | 6/1998 |

* cited by examiner

Primary Examiner—Dung T. Nguyen
(74) Attorney, Agent, or Firm—Frishauf, Holtz, Goodman & Chick, P.C.

(57) ABSTRACT

A field sequential liquid crystal display apparatus includes columnar spacers disposed between a pair of substrates to determine a thickness of a liquid crystal layer between the substrates, and spacer support portions formed on portions opposite to the columnar spacers. A driving device supplies a voltage corresponding to image data of one color corresponding to one of a plurality of colors between pixel electrodes and common electrode of the liquid crystal display device, thereby controlling a light transmission through the respective pixel regions, and allowing a light source to generate the light of the color of the image data and to emit the lights to the pixel regions.

16 Claims, 6 Drawing Sheets

US 6,972,822 B2

FIELD SEQUENTIAL LIQUID CRYSTAL DISPLAY APPARATUS USING ACTIVE MATRIX LIQUID CRYSTAL DISPLAY DEVICE

CROSS-REFERENCE TO RELATED APPLICATIONS

This application is based upon and claims the benefit of priority from the prior Japanese Patent Application No. 2001-294680, filed Sep. 26, 2001, the entire contents of which are incorporated herein by reference.

BACKGROUND OF THE INVENTION

1. Field of the Invention

The present invention relates to a field sequential liquid crystal display apparatus in which an active matrix liquid crystal display device is used, a plurality of fields each for displaying a single color are mixed, and one color image is displayed.

2. Description of the Related Art

In an active matrix liquid crystal display device in which a TFT is used as an active device, on an inner surface of a first substrate of a pair of first and second substrates disposed opposite to each other via a liquid crystal layer, there are disposed: a plurality of pixel electrodes arranged in a matrix form; a plurality of thin film transistors connected to the plurality of pixel electrodes; a plurality of gate lines which supply gate signals to the plurality of thin film transistors; and a plurality of data lines which supply data signals to the plurality of thin film transistors. An opposed electrode is disposed on an inner surface of the second substrate. The TFT includes a stacked film structure including a gate electrode, gate insulating film, i-type semiconductor film, blocking insulating film, n-type semiconductor film, source and drain electrodes, and overcoat insulating film.

On the liquid crystal display device, particulate spacers are dispersed on one substrate, and each particulate spacer is held between the pair of substrates. A gap between the first and second substrates is defined in such a manner that a liquid crystal layer thickness of a plurality of pixel portions constituted by disposing the plurality of pixel electrodes and opposed electrode opposite to each other is in a range of 4 $\mu$m to 5 $\mu$m.

The particulate spacers dispersed on the substrate are also distributed in the pixel portion. Therefore, light leaks from portions corresponding to the particulate spacers, and deteriorates contrast of display of the liquid crystal display device. Moreover, it is difficult to uniformly define the gap, therefore the liquid crystal layer thickness of the plurality of pixel portions becomes nonuniform, and display unevenness is generated.

In recent years, there has been proposed a field sequential display apparatus in which one frame for displaying one color image is divided into a plurality of fields, a plurality of colors are successively displayed for each field in the liquid crystal display device, the displays of a plurality of colors are mixed for the respective fields, and one color image is displayed.

The field sequential display apparatus uses an active matrix liquid crystal display device in which an active device is used. For the liquid crystal display device, since three fields for displaying three colors of red, green, and blue constitute one frame for forming one image, one field for displaying one color is ⅓ of one frame, and a data signal corresponding to one color in one field has to be written and displayed in the liquid crystal display device. There has been a demand for a high-speed response in the liquid crystal display device. For this, it is necessary to reduce the liquid crystal layer thickness of the pixel portion, for example, to about 1.5 $\mu$m.

However, in the above-described conventional active matrix liquid crystal display device, it is difficult to reduce the liquid crystal layer thickness of the pixel portion to the above-described degree and uniformly form the layer.

BRIEF SUMMARY OF THE INVENTION

An object of the present invention is to provide a field sequential liquid crystal display apparatus in which an active matrix liquid crystal display device having a remarkably small and uniform liquid crystal layer thickness is used. The liquid crystal display device for use in the present invention is formed by patterning a resin film between a pair of substrates disposed opposite to each other in the active matrix liquid crystal display device. A plurality of columnar spacers for determining a thickness of a liquid crystal layer between the pair of substrates are arranged, whereby the thickness of the liquid crystal layer a pixel portion can be thin and uniform in a range of about 1.475 to 2.2 $\mu$m.

To achieve the object, according to a first aspect of the present invention, there is provided a liquid crystal display apparatus comprising:

(a) a liquid crystal display device including:

a pair of substrates disposed opposite to each other, at least one common electrode formed on one of inner surfaces of the pair of substrates disposed opposite to each other, a plurality of pixel electrodes which are formed on the other inner surface of the pair of substrates disposed opposite to each other and in which regions disposed opposite to the common electrode form pixel regions, a plurality of active devices which are disposed corresponding to the plurality of pixel electrodes on the other inner surface of the pair of substrates disposed opposite to each other and which supply data signals corresponding to image data to the pixel electrodes, a liquid crystal layer disposed between the pair of substrates, and a plurality of columnar spacers which are formed by patterning a resin film on any one of the inner surfaces of the pair of substrates disposed opposite to each other and which determine a thickness of the liquid crystal layer between the pair of substrates, so transmission of light through the pixel regions is controlled in accordance with a voltage applied between the pixel electrodes and common electrode;

(b) a light source which is disposed on a side opposite to an observation side of the liquid crystal display device and which selectively generates lights of a plurality of different colors and emits the lights to the respective pixel regions; and (c) a control device which supplies the data signal corresponding to the image data of one color corresponding to one of the colors generated by the light source onto the pixel electrodes from the active devices, applies the voltage corresponding to the image data between the respective pixel electrodes and common electrode of the liquid crystal display device, thereby controlling the light transmission through the respective pixel regions of the liquid crystal display device, and allows the light source to generate the light of the color of the image data and to emit the lights to the respective pixel regions of the liquid crystal display device.

According to the liquid crystal display apparatus of the first aspect, the liquid crystal layer thickness of the pixel portion can be reduced. Therefore, liquid crystal molecules can respond at a high speed. Since the layer thickness is uniform over the whole liquid crystal display device, superior display having no unevenness in brightness is possible.

In the present invention, in the liquid crystal layer of the liquid crystal display device, a liquid crystal is used having a homogeneous alignment in which liquid crystal molecules are substantially parallel to the surface of the substrate without any electric field applied between the electrodes, an arrangement of the liquid crystal molecules is not twisted, and the liquid crystal molecules are arranged in one direction.

Moreover, the liquid crystal layer thickness of the liquid crystal display device is preferably set to a range of 1.475 to 2.2 $\mu$m.

Furthermore, the columnar spacer are formed by patterning a photosensitive resin film formed on any one of the inner surfaces of the pair of substrates disposed opposite to each other by a photolithography process. The columnar spacer are disposed between the pair of substrates disposed opposite to each other in regions other than the pixel regions of the liquid crystal display device and regions with the active devices formed therein. The columnar spacers may be formed on the inner surface of the substrate on which the pixel electrodes and active devices are disposed in the pair of substrates, or on the inner surface of the substrate on which the common electrode is disposed in the pair of substrates.

Moreover, it is preferable to form a shield film for shielding the region other than the pixel region on the inner surface of the substrate on which the common electrode is disposed in the pair of substrates. It is also preferable to form the columnar spacer on the shield film and common electrode on the inner surface of the substrate. Furthermore, the columnar spacers are preferably formed so as to have one-to-one correspondence with the active devices.

Furthermore, the liquid crystal display device of the present invention includes the columnar spacers. Moreover, in portions disposed opposite to the columnar spacers on the substrate (second substrate) disposed opposite to the substrate (first substrate) with the columnar spacers formed thereon in the pair of substrates, spacer support portions are formed which protrude from the surface of the second substrate and on which the columnar spacers abut. The spacer support portions are formed on the second substrate surface in this manner. Therefore, without forming an excessively thick or thin film having a nonuniform film thickness, the resin film for forming the columnar spacer can be formed in an appropriate film thickness. Therefore, the gap between the first and second substrates defined by the columnar spacer is set to be uniform, and the liquid crystal layer thickness of a plurality of pixel portions in which the plurality of pixel electrodes are disposed opposite to the opposed electrode can be reduced.

Therefore, according to the liquid crystal display device, the liquid crystal layer thickness of the pixel portion is reduced, and a response speed is increased. Moreover, the plurality of columnar spacers are formed with a uniform height, the liquid crystal layer thickness of the plurality of pixel portions is set to be uniform, and a satisfactory display quality having no display unevenness can be obtained.

In the liquid crystal display device, the columnar spacer is formed on the inner surface of the first substrate on which the common electrode is disposed in the pair of substrates. On the inner surface of the second substrate on which the pixel electrode and active device are disposed in the pair of substrates, each of the spacer support portions is formed by stacked films including a gate insulating film of the active device, an extended electrode portion extended from one of source and drain electrodes, and an overcoat film with which the active device is coated. Moreover, the spacer support portion is formed by the other stacked films excluding an i-Si film, n-Si film, and blocking layer of the active device. Even in this case, the liquid crystal layer thickness of the liquid crystal display device is appropriate in a range of 1.475 to 2.2 $\mu$m.

According to a second aspect of the present invention, there is provided a liquid crystal display apparatus comprising:

a liquid crystal display device including: first and second substrates disposed opposite to each other; at least one common electrode formed on an inner surface of the first substrate disposed opposite to the second substrate; a plurality of pixel electrodes which are formed on the inner surface of the second substrate disposed opposite to the first substrate and in which regions disposed opposite to the common electrode form pixel regions; a plurality of active devices which are disposed opposite to the plurality of pixel electrodes on the inner surface of the second substrate and which supply data signals corresponding to image data to the pixel electrodes; a liquid crystal layer disposed between the first and second substrates; a plurality of columnar spacers which are formed by patterning a resin film on any one of the inner surfaces of the first and second substrates and which determine a thickness of the liquid crystal layer between the first and second substrates; and a plurality of spacer support portions which are formed to protrude from the inner surface of the second substrate in portions disposed opposite to the columnar spacers and on which the plurality of columnar spacers abut, so that transmission of light through the respective pixel regions is controlled in accordance with a voltage applied between the pixel electrodes and common electrode;

a light source which is disposed on a side opposite to an observation side of the liquid crystal display device and which selectively generates lights of a plurality of different colors and emits the lights to the respective pixel regions; and a driving device which supplies the data signal corresponding to the image data of one color corresponding to one of the plurality of colors generated by the light source onto the pixel electrodes via the active devices, applies the voltage corresponding to the image data between the respective pixel electrodes and common electrode of the liquid crystal display device, thereby controlling the light transmission through the respective pixel regions of the liquid crystal display device, and allowing the light source to generate the light of the color of the image data and to emit the lights to the respective pixel regions of the liquid crystal display device.

According to the liquid crystal display apparatus of the second aspect, the spacer support portions disposed opposite to the columnar spacers are formed on the second substrate surface in the first and second substrates disposed opposite to each other in the liquid crystal display device. Therefore, without forming the excessively thick or thin film having a nonuniform film thickness, the resin film for forming the columnar spacers can be formed in an appropriate film thickness. Therefore, the gap between the first and second substrates defined by the columnar spacers is set to be uniform, and the liquid crystal layer thickness of a plurality of pixel portions in which the plurality of pixel electrodes are disposed opposite to the opposed electrode can be reduced. Moreover, the response speed is increased, the plurality of columnar spacers are formed with a uniform height, the liquid crystal layer thickness of the plurality of pixel portions is set to be uniform, and the satisfactory display quality can be obtained without any display unevenness.

For the liquid crystal display device for use in the present invention, the liquid crystal layer having a layer thickness in a range of 1.475 to 2.2 μm is appropriate.

Moreover, the columnar spacer is formed between the first and second substrates in a region other than the pixel region of the liquid crystal display device and the region with the active devices formed thereon. On the other hand, on the inner surface of the second substrate, the spacer support portion is preferably formed by stacked films including a gate insulating film of the active device, an extended electrode extended from one of source and drain electrodes, and an overcoat film with which the active device is coated. By this constitution, the spacer support portion is simultaneously formed using a forming step of the TFT, and a manufacturing cost of the liquid crystal display device can be reduced.

Moreover, the liquid crystal layer of the liquid crystal display device is preferably formed by a liquid crystal having a homogeneous alignment in which liquid crystal molecules are arranged without being twisted and molecule longitudinal axes are aligned in one direction between the first and second substrates.

According to a third aspect of the present invention, there is provided a liquid crystal display apparatus comprising:

a liquid crystal display device including: first and second substrates disposed opposite to each other; at least one common electrode formed on an inner surface of the first substrate disposed opposite to the second substrate; a plurality of pixel electrodes which are formed on the inner surface of the second substrate disposed opposite to the first substrate and in which regions disposed opposite to the common electrode form pixel regions; a plurality of writing active devices which are disposed opposite to the plurality of pixel electrodes on the inner surface of the second substrate and which supply data signals corresponding to image data to the respective pixel electrodes; a plurality of resetting active devices which are disposed opposite to the plurality of pixel electrodes on the inner surface of the second substrate and which supply reset signals to the respective pixel electrodes; a liquid crystal layer disposed between the first and second substrates; a plurality of columnar spacers which are formed by patterning a resin film on any one of the inner surfaces of the first and second substrates and which determine a thickness of the liquid crystal layer between the first and second substrates; and a plurality of spacer support portions which are formed to protrude from the surface of the second substrate in portions disposed opposite to the columnar spacers and on which the columnar spacers abut, so that transmission of light through the respective pixel regions is controlled in accordance with a voltage applied between the pixel electrodes and common electrode;

a light source which is disposed on a side opposite to an observation side of the liquid crystal display device and which selectively generates lights of a plurality of different colors and emits the lights to the respective pixel regions; and a driving device which supplies the reset signals to the pixel electrodes from the resetting active devices, thereby applies a reset voltage between the respective pixel electrodes and common electrode of the liquid crystal display device, subsequently supplies the data signal corresponding to the image data of one color corresponding to one of the colors generated by the light source from the writing active devices, thereby applying a write voltage between the respective pixel electrodes and common electrode, thereby controls the light transmission through the respective pixel regions of the liquid crystal display device, and allowing the light source to generate the light of the color of the image data and to emit the lights to the respective pixel regions of the liquid crystal display device.

According to the display apparatus of the third aspect, the spacer support portions disposed opposite to the columnar spacers are formed on the second substrate surface in the first and second substrates disposed opposite to each other in the liquid crystal display device. Therefore, without forming the excessively thick or thin film having a nonuniform film thickness, the resin film for forming the columnar spacer can be formed in an appropriate film thickness. Therefore, the substrate gap defined by the columnar spacer is set to be uniform, and the liquid crystal layer thickness of a plurality of pixel portions in which the plurality of pixel electrodes are disposed opposite to the opposed electrode can be reduced. Moreover, the response speed is increased, the plurality of columnar spacers are formed with a uniform height, the liquid crystal layer thickness of the plurality of pixel portions is set to be uniform, and the satisfactory display quality can be obtained without any display unevenness. Furthermore, since the resetting active devices are disposed, a reset operation of each pixel can be performed independently of a writing operation, and the driving suitable for a high-speed response becomes simple and easy.

In the liquid crystal display device of the liquid crystal display apparatus, the spacer support portions are disposed beside the writing active devices and resetting on the inner surface of the second substrate, and the columnar spacers are preferably disposed in positions disposed opposite to the spacer support portions between the first and second substrates.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A liquid crystal display apparatus will be described below as embodiments of the present invention with reference to the accompanying drawings.

[First Embodiment]

Figure 1:
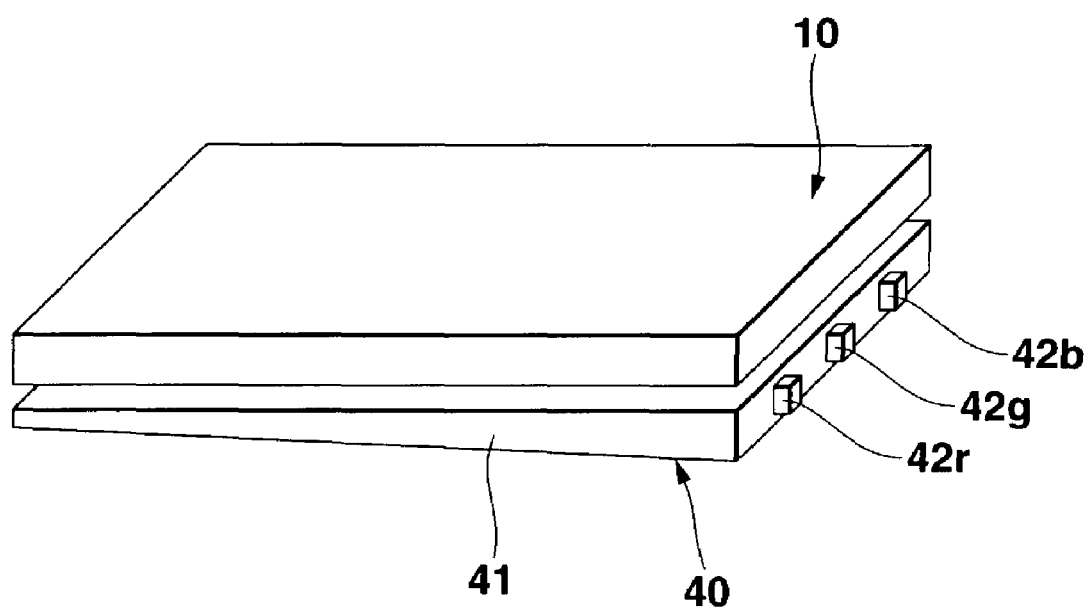
FIG. 1 is a perspective view showing a schematic constitution of a liquid crystal display apparatus according to a first embodiment of the present invention.

A first embodiment of the present invention relates to a field sequential liquid crystal display apparatus. As shown in FIG. 1, the apparatus includes: an active matrix liquid crystal display device 10 which includes a plurality of pixels arranged in a matrix form and which controls light transmission through the pixels in accordance with a voltage applied to an electrode of each pixel; and a lighting apparatus 40 which is disposed on a side opposite to an observation side of the liquid crystal display device 10. The apparatus 40 includes an optical waveguide 41, and light sources 42r, 42g, 42b of colors disposed on one end of the optical waveguide 41 for emitting lights of the respective colors of red R, green G, and blue B. The waveguide 41 uniformly guides the lights from the light sources 42r, 42g, 42b of the respective colors to the whole surface of the liquid crystal display device 10, and illuminates the liquid crystal display device 10.

Figure 2:
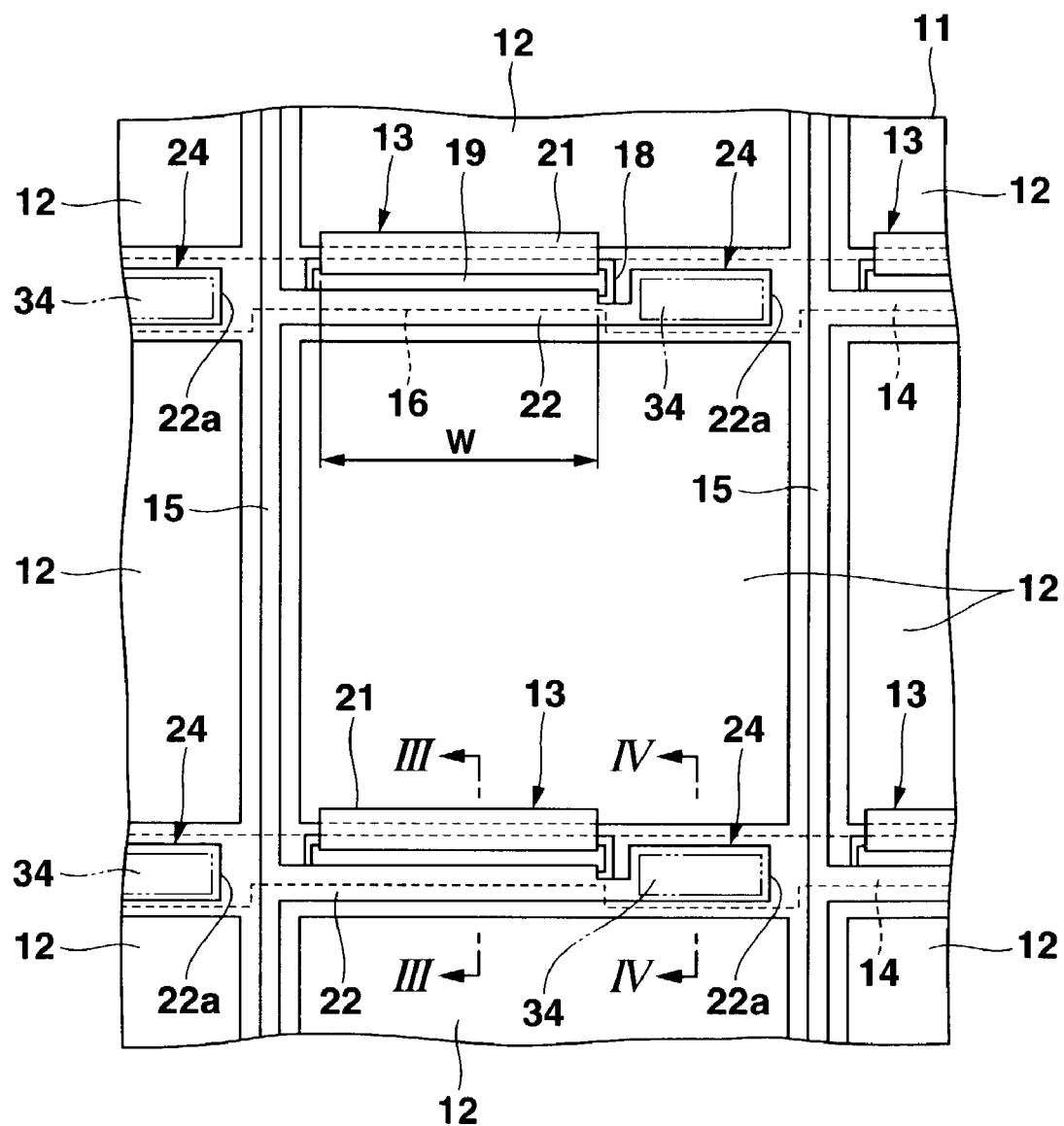
FIG. 2 is an enlarged plan view showing a part of a liquid crystal display device according to the first embodiment of the present invention in an enlarged manner.
Figure 3:
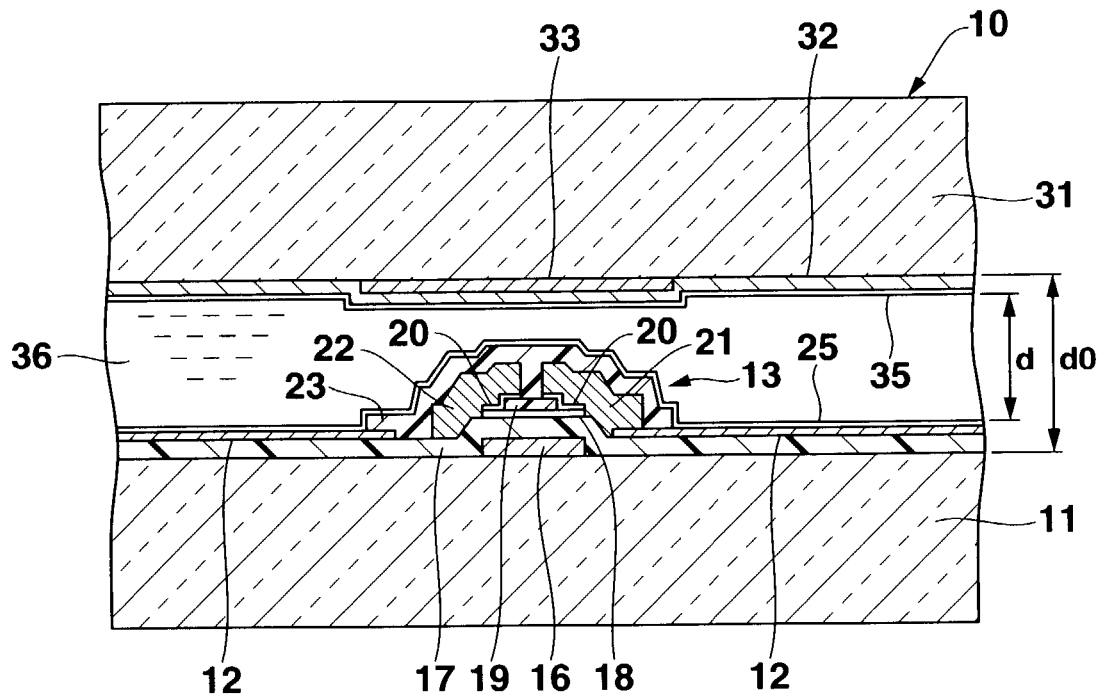
FIG. 3 is an enlarged sectional view of the liquid crystal display device taken along line III—III of FIG. 2.
Figure 4:
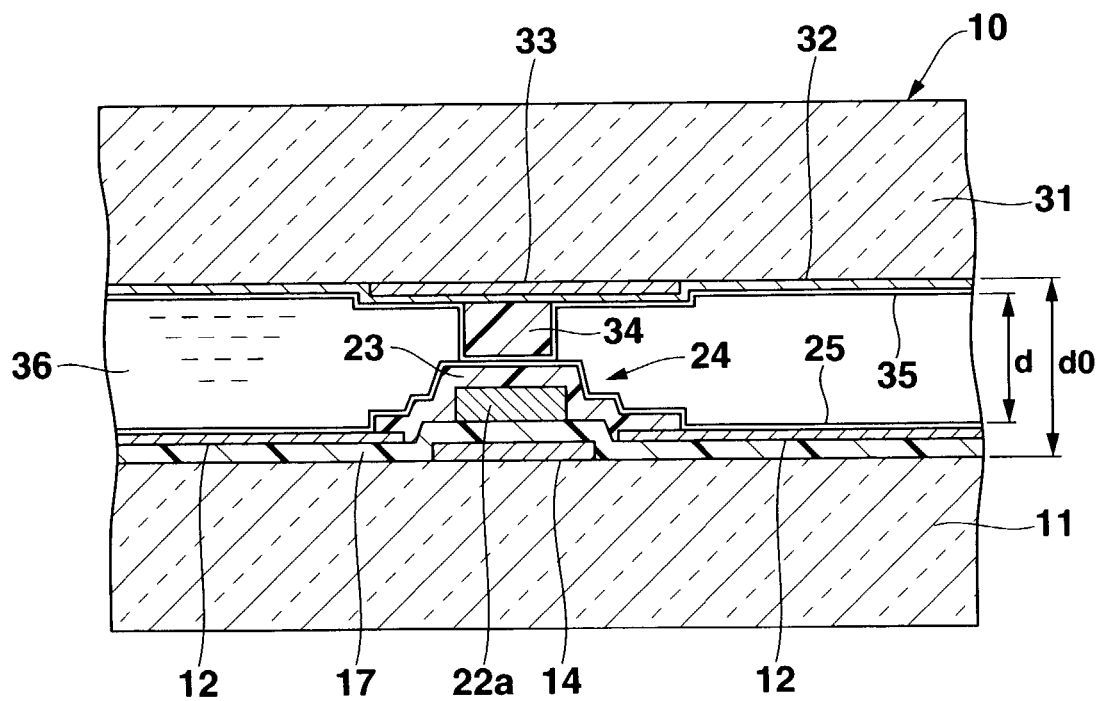
FIG. 4 is an enlarged sectional view of the liquid crystal display device taken along line IV—IV of FIG. 2.

In the active matrix liquid crystal display device 10 for use in the field sequential liquid crystal display apparatus according to the present embodiment, as shown in FIGS. 2 to 4, first and second transparent substrates 11, 31 are disposed opposite to each other via a liquid crystal layer 36. On an inner surface of the first substrate (hereinafter referred to as a back substrate) 11 disposed below in FIGS. 3 and 4, a plurality of pixel electrodes 12 arranged in a matrix form, a plurality of TFTs 13 respectively connected to the plurality of pixel electrodes 12, a plurality of gate lines 14 which supply gate signals to the TFTs 13, and a plurality of data lines 15 which supply data signals to the TFTs 13 are formed. On the inner surface of the second substrate (hereinafter referred to as a front substrate) 31 disposed above in FIGS. 3 and 4, an opposed electrode 32 is formed.

First, the back substrate 11 will be described. The plurality of pixel electrodes 12 are arranged in the matrix form in a row direction (left/right direction in FIG. 2) and column direction (upper/lower direction in FIG. 2). The plurality of gate lines 14 are formed along one side of each pixel electrode row (left side in FIG. 2), and the plurality of data lines 15 are formed along one side of each pixel electrode column (lower side in FIG. 2).

The back substrate 11 includes terminal arrangement portions (not shown) which protrude outside the front substrate 31 on either one of left and right edges and either one of upper and lower edges. One end of the plurality of gate lines 14 and one end of the plurality of data lines 15 are derived out to the terminal arrangement portion, and connection terminals to row and column drivers are formed on the ends.

As shown in FIGS. 3 and 4, the TFT 13 has a stacked film structure including a gate electrode 16 formed on the substrate surface of the back substrate 11, a gate insulating film 17 with which the gate electrode 16 is coated, an i-type semiconductor film 18 formed opposite to the gate electrode 16 on the gate insulating film 17, a blocking insulating film 19 formed on a middle portion as a channel region of the i-type semiconductor film 18, source and drain electrodes 21, 22 formed on opposite side portions of the i-type semiconductor film 18 via n-type semiconductor films 20, and an overcoat insulating film 23 with which these films are coated.

FIG. 3 shows the source electrode 21 and drain electrode 22 as single-layer films, but each of the source electrode 21 and drain electrode 22 is preferably formed of a chromium film as a contact layer with the n-type semiconductor film 20 and an aluminum-based alloy film formed on the chromium film.

The gate line 14 is formed by the aluminum-based alloy film having a low resistance, on the substrate surface of the back substrate 11, and the gate electrode 16 of the TFT 13 is formed integrally with the gate line 14.

The gate insulating film 17 of the TFT 13 is disposed over the whole inner surface of the back substrate 11, and the plurality of gate lines 14 are coated with the gate insulating film 17.

In the field sequential liquid crystal display apparatus of the present embodiment, one frame in which one color image is displayed is constituted of three fields in which unit colors, for example, of red, green, blue are displayed. For each field in which one unit color is displayed, the image data of one unit color is written in each pixel of the liquid crystal display device, and therefore a write period becomes remarkably short. Additionally, a pixel capacity formed by the pixel electrodes 12, the opposed electrode 32 disposed on the inner surface of the front substrate 31, and a liquid crystal layer 35 between the electrodes is large because of a small liquid crystal layer thickness d. Therefore, in the present embodiment, as shown in FIG. 3, a portion of the gate line 14 corresponding to each pixel electrode 12 is formed as the gate electrode 16 of the TFT 13. Moreover, the i-type semiconductor film 18, n-type semiconductor films 20, and source and drain electrodes 21, 22 are formed to be long along a length direction of the gate line 14. Thereby, the TFT 13 having a large channel width W is formed, an allowable amount of current is increased, and electric charges corresponding to the data signal supplied from the data line 15 can sufficiently be charged in a large pixel capacity.

The data line 15 is formed by the same metal film (stacked film of the chromium film and the aluminum-based alloy film formed on the chromium film) as the metal film of the source and drain electrodes 21, 22 of the TFT 13, and the drain electrode 22 of the TFT 13 is formed integrally with the data line 15.

The pixel electrode 12 is formed by a transparent conductive film such as an ITO film formed on the gate insulating film 17, and the edge of the pixel electrode 12 is connected to the source electrode 21 of the TFT 13.

The overcoat insulating film 23 of the TFTs 13 is disposed over the whole inner surface of the back substrate 11, and the plurality of data lines 15 are coated with the overcoat insulating film 23.

The overcoat insulating film 23 includes openings in portions corresponding to the plurality of pixel electrodes 12. The connection terminals (not shown) formed on the ends of the plurality of gate lines 14 are exposed by the openings formed in the overcoat insulating film 23 and gate insulating film 17 stacked on the terminals. The connection terminals (not shown) formed on the ends of the plurality of data lines 15 are exposed by the openings formed in the overcoat insulating film 23 formed on the terminals.

As shown in FIGS. 2 and 4, on the inner surface of the back substrate 11 excluding the plurality of pixel electrodes 12 and TFTs 13, a plurality of spacer support portions 24 formed by the stacked films forming the TFTs 13, excluding the i-type semiconductor film 18, blocking insulating film 19, and n-type semiconductor films 20 are disposed at predetermined pitches.

In the present embodiment, the spacer support portions 24 are positioned beside the plurality of TFTs 13, and arranged at the same pitches as the arrangement pitches of the TFTs 13. Moreover, the spacer support portion 24 is formed by the gate line 14 formed integrally with the gate electrode 16 of the TFT 13, the gate insulating film 17, either one of the source and drain electrodes 21, 22 of the TFT 13, an extended electrode 22a extended into the portion on the gate line 14, for example, from the drain electrode 22, and a part of the overcoat insulating film 23.

On the surface of the back substrate 11 contacting the liquid crystal layer, an alignment film 25 of polyimide is formed over the whole display area in which the plurality of pixel electrodes 12 are arranged in the matrix form.

The front substrate 31 will next be described. As shown in FIGS. 3 and 4, the opposed electrode 32 disposed opposite to the plurality of pixel electrodes 12, and a shield film 33 corresponding to a region between the pixel electrodes 12 are disposed on the inner surface of the front substrate 31.

The shield film 33 is a lattice-shaped film in which the openings are formed in regions corresponding to the plurality of pixel electrodes 12. FIGS. 3 and 4 show the shield film 33 as the single-layer film, but the shield film 33 is preferably formed of a chromium oxide film formed on the substrate surface of the front substrate 31, and a chromium film formed on the chromium oxide film.

The opposed electrode 32 is formed of a transparent conductive material such as ITO. The opposed electrode 32 is formed in one film with which the shield film 33 is coated over the whole display area.

On the inner surface of the front substrate 31, as shown in FIGS. 3 and 4, a plurality of columnar spacers 34 for defining a gap between the pair of substrates 11, 31 are disposed opposite to the spacer support portions 24 disposed on the inner surface of the back substrate 11. The columnar spacers 34 are formed on the stacked film of the shield film 33 and opposed electrode 32 disposed on the inner surface of the front substrate 31.

A forming method of the columnar spacers 34 comprises: forming the shield film 33 and opposed electrode 32 on the inner surface of the front substrate 31; subsequently coating the inner surface of the front substrate 31 with a resin material including a photoresist by a spin coat process in a film thickness corresponding to a height of the columnar spacer 34; and patterning the resin film by a photography process.

On the surface of the front substrate 31 in contact with the liquid crystal layer, the alignment film 35 of polyimide is formed over the whole display area, and the columnar spacers 34 are coated with the alignment film 35.

For the pair of substrates 11, 31, the plurality of columnar spacers 34 disposed on the inner surface of the front substrate 31 are allowed to abut on the surface of the alignment film 25 on the plurality of spacer support portions 24 disposed on the inner surface of the back substrate 11 via the alignment film 35 with which the columnar spacers 34 are coated. Thereby, these columnar spacers 34 define a gap $d_0$ between the substrate surfaces of the pair of substrates 11, 31. The substrates are bonded to each other via a frame-shaped seal member (not shown) which surrounds the display area.

As not shown, on the opposed electrode 32 disposed on the inner surface of the front substrate 31, a plurality of cross connection portions derived into the portion corresponding to the frame-shaped seal member or to the outside of the frame-shaped seal member are formed. On the inner surface of the back substrate 11, a cross electrode disposed opposite to the plurality of cross connection portions of the opposed electrode 32, and terminals for the opposed electrode derived to the terminal arrangement portion from the cross electrode are disposed. The cross connection portions of the opposed electrode 32 are connected to the cross electrode via a conductive cross member disposed inside or outside the frame-shaped seal member.

As not shown, a liquid crystal intake port is formed in the frame-shaped seal member by partially cutting the seal member. A liquid crystal is filled into a region surrounded by the frame-shaped seal member between the pair of substrates 11, 31 via the liquid crystal intake port by a vacuum intake process, so that the liquid crystal layer 36 is formed. After the liquid crystal is filled, the liquid crystal intake port is sealed by a seal resin.

The liquid crystal display device of the present embodiment is, for example, a homogeneous alignment liquid crystal display device in which liquid crystal molecules of the liquid crystal layer 36 are homogeneously arranged in one direction. In this constitution, polarization plates are respectively disposed on the outer surfaces of the pair of substrates 11, 31, and a phase plate for raising a contrast of display and enlarging a view field angle is disposed between either one substrate and the polarization plate on the side of this substrate.

In this liquid crystal display device, the plurality of columnar spacers 34 for defining the gap $d_0$ of the pair of substrates 11, 31 are disposed in positions excluding a plurality of pixel portions in which the plurality of pixel electrodes 12 are disposed opposite to the opposed electrode 32. Therefore, light leak is not caused in the pixel portions.

Moreover, in the liquid crystal display device, on the inner surface of the back substrate 11 excluding the pixel electrodes 12 and TFTs 13, the plurality of spacer support portions 24 of the stacked films forming the TFTs 13 other than the i-type semiconductor film 18, blocking insulating film 19, and n-type semiconductor films 20 are arranged at predetermined pitches (the same pitches as the arrangement pitches of the TFTs 13 in the present embodiment). On the inner surface of the front substrate 31, the plurality of columnar spacers 34 for defining the gap of the pair of substrates 11, 31 are disposed opposite to the plurality of spacer support portions 24. Therefore, even when the height of the columnar spacer 34 is not excessively reduced, the substrate gap $d_0$ defined by the columnar spacers 34 is reduced. Moreover, the liquid crystal layer thickness d of the plurality of pixel portions in which the plurality of pixel electrodes 12 are disposed opposite to the opposed electrode 32 can be reduced.

In the liquid crystal display device of the present embodiment, the film thickness of the gate line 14 and gate electrode 16 was set to 0.23 $\mu$m, the film thickness of the gate insulating film 17 was 0.25 $\mu$m, the film thickness of the i-type semiconductor film 18 was 0.025 $\mu$m, the film thickness of the blocking insulating film 19 was 0.10 $\mu$m, the film thickness of the n-type semiconductor film 20 was 0.025 $\mu$m, the film thickness of the source and drain electrodes 21, 22 was 0.425 $\mu$m, the film thickness of the overcoat insulating film 23 was 0.20 µm, the film thickness of the pixel electrode 12 was 0.05 µm, the film thickness of the shield film 33 was 0.17 µm, the film thickness of the opposed electrode 32 was 0.14 µm, and the film thickness of the alignment films 25, 35 was 0.05 µm.

Therefore, for example, to set the liquid crystal layer thickness d of the pixel portion to 1.5 µm, the columnar spacer 34 may be formed in a height such that the gap $d_0$ can be defined as 2.04 µm.

In the liquid crystal display device, the spacer support portions 24 are formed by the stacked films forming the TFTs 13 excluding the i-type semiconductor film 18, blocking insulating film 19, and n-type semiconductor films 20. Therefore, the height of the spacer support portion 24 is less than the height of the TFT 13 by a total value of the film thickness of the i-type semiconductor film 18, blocking insulating film 19, and n-type semiconductor films 20.

The height of the TFT 13 (the total value of the film thickness of the gate electrode 16, gate insulating film 17, i-type semiconductor film 18, blocking insulating film 19, n-type semiconductor films 20, source and drain electrodes 21, 22, and overcoat insulating film 23) is 1.25 µm. The total value of the film thickness of the i-type semiconductor film 18, blocking insulating film 19, and n-type semiconductor films 20 is 0.15 µm. Therefore, the spacer support portion has a height of 1.105 µm.

Therefore, to define the gap $d_0$ to 2.04 µm and set the liquid crystal layer thickness d to 1.5 µm as described above, a necessary height of the columnar spacer 34 is 0.525 µm.

On the other hand, as described above, the forming method of the columnar spacers 34 comprises coating the inner surface of the front substrate 31 with the resin material such as the photoresist by the spin coat process in the film thickness in accordance with the height of the columnar spacer 34, and patterning the resin film by the photography process.

In this case, the coat thickness of the resin material can be controlled by adjustment of a rotation speed and time of the substrate 31 in accordance with viscosity of the resin material. However, a coat thickness value at which the coat thickness of the resin material can be controlled with good precision is in a range of 0.5 µm to 2.0 µm. If the coat thickness is larger or smaller than the range, unevenness may be generated in the coat thickness, and dispersion may be generated in the height of the columnar spacer 34 formed by patterning the resin film.

In the liquid crystal display device, since the height of the columnar spacer 34 necessary for defining the gap $d_0$ to 2.04 µm and setting the liquid crystal layer thickness d to 1.5 µm is 0.525 µm. Therefore, the coat thickness of the resin material is in a range of 0.5 µm to 2.0 µm in which the thickness can be controlled with good precision. Therefore, it is possible to apply the resin material in the uniform thickness and to form the plurality of columnar spacers 34 with a uniform height.

As a result, according to the liquid crystal display device, the liquid crystal layer thickness d of the pixel portion is reduced and the response speed is increased. Moreover, the plurality of columnar spacers 34 are formed with the uniform height, the liquid crystal layer thickness d of the plurality of pixel portions is set to be uniform, and a satisfactory display quality can be obtained without any display unevenness.

The liquid crystal layer thickness d is not limited to 1.5 µm as described above, and is selected from a range of 0.5 µm to 2.0 µm in which the coat thickness of the resin material can be controlled with good precision. Thereby, the thickness can optionally be set in a range of 1.475 µm (liquid crystal layer thickness obtained when setting the height of the columnar spacer 34 to 0.5 µm) to 2.975 µm (liquid crystal layer thickness obtained when setting the height of the columnar spacer 34 to 2.0 µm). Additionally, the liquid crystal layer thickness d is preferable in a range of 1.475 µm to 2.2 µm. With the liquid crystal layer thickness d in this range, the response speed can sufficiently be increased. In this case, the height of the columnar spacer 34 is in a range of 0.5 µm to 1.2 µm.

Furthermore, the liquid crystal layer thickness d is more preferable in a range of 1.475 µm to 1.625 µm. When the liquid crystal layer thickness d is set to this value, the response speed can further be increased.

Additionally, in the present embodiment, the spacer support portion 24 is formed by the gate line 14, gate insulating film 17, extended electrode 22a extended to the portion on the gate line 14 from the drain electrode 22 of the TFT 13, and the part of the overcoat insulating film 23. Therefore, the forming process of the TFTs 13 can be used to simultaneously form the spacer support portions 24, and the manufacturing cost of the liquid crystal display device can be reduced.

In the present embodiment, the drain electrode 22 of the TFT 13 is extended onto the portion of the gate line 14 to form the extended electrode 22a, but the extended electrode may also be formed by extending the source electrode 21 of the TFT 13 onto the portion on the gate line 14.

Figure 5:
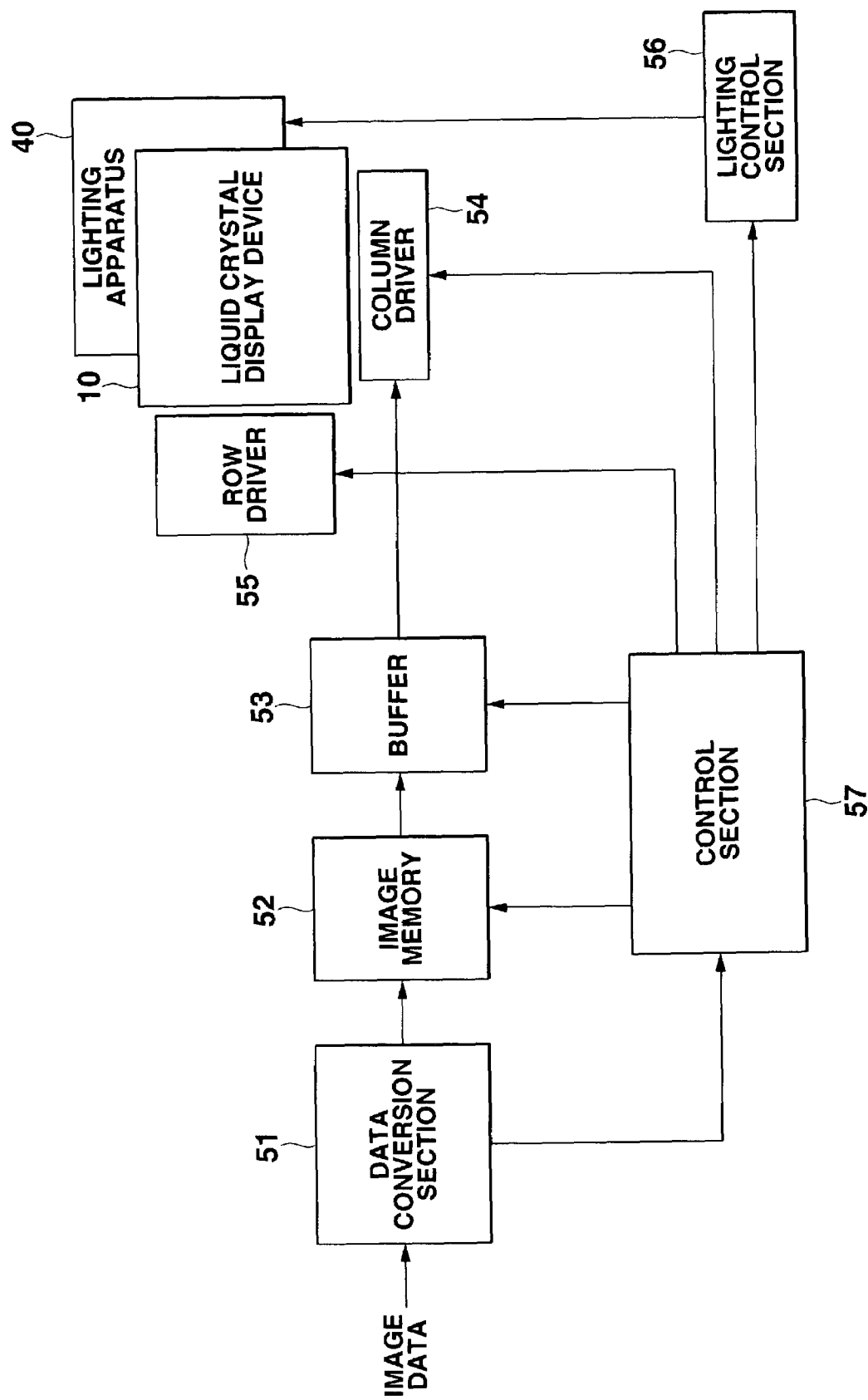
FIG. 5 is a block diagram showing a driving circuit of a liquid crystal apparatus of the first embodiment.

The above-described field sequential liquid crystal display apparatus is driven by a driving circuit shown in FIG. 5. This driving circuit includes; a data conversion section 51 which converts image data supplied from the outside to R, G, B image data of the respective colors of red, green and blue, and a control signal; an image memory 52 in which the converted R, G, B image data are stored; a buffer 53 to which the R, G, B image data read from the image memory 52 are supplied and which outputs the R, G, B image data as serial image data; a column driver 54 which receives the R, G, B image data outputted from the buffer 53, and supplies the data signal corresponding to each image data to each data line of the liquid crystal display device 10; a row driver 55 which supplies a gate signal for successively scanning each gate line 14 to the gate line 14 of the liquid crystal display device 10; a lighting control section 56 which drives the lighting apparatus 40; and a control section 57 which controls writing/reading of the image memory 52 and operations of the buffer 53, row driver 55, column driver 54 and lighting control section 56.

Figure 6:
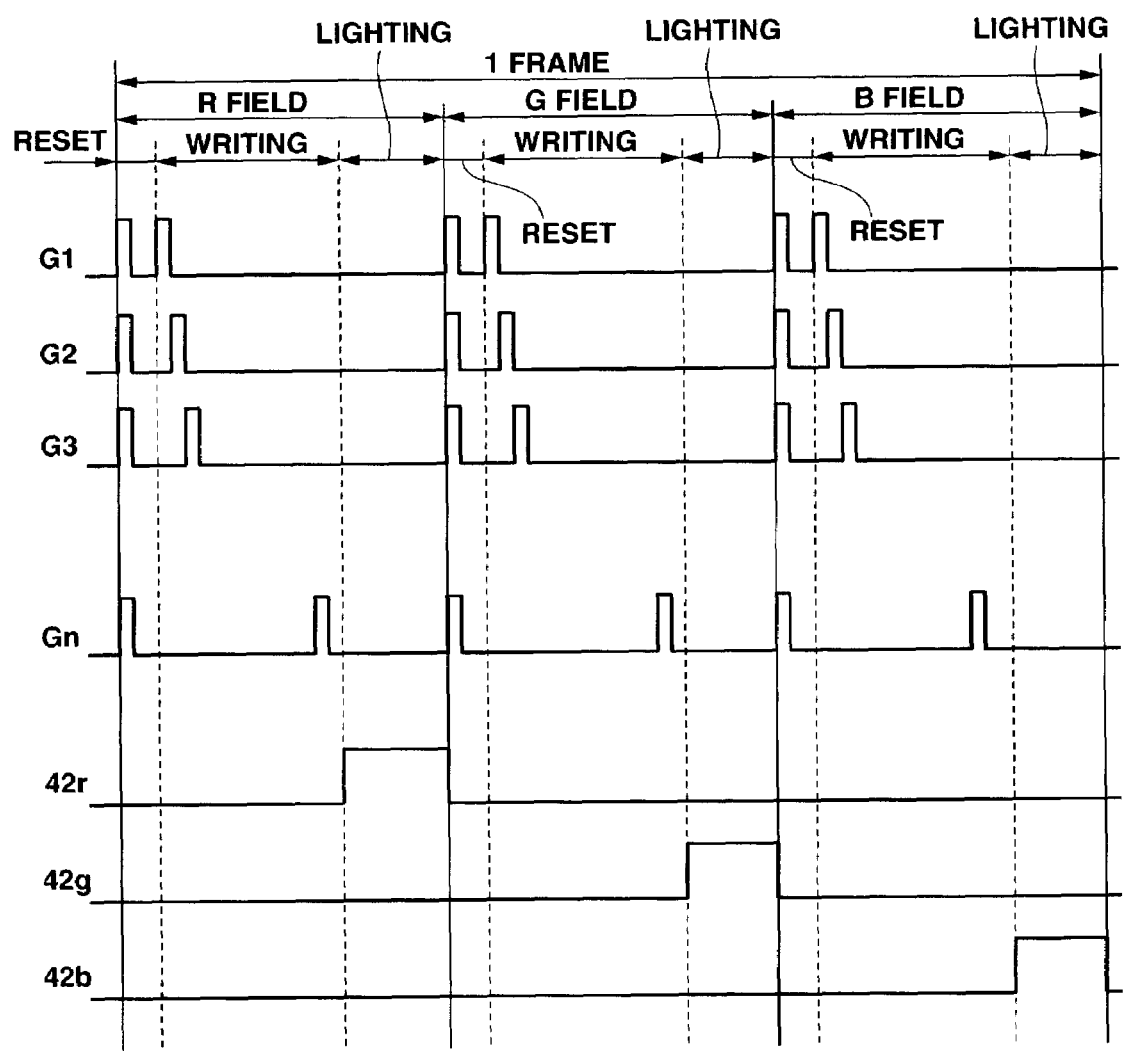
FIG. 6 is a time chart showing an operation of the liquid crystal display apparatus according to the first embodiment.

An operation of the field sequential liquid crystal display apparatus according to the present embodiment will next be described. FIG. 6 shows the gate signals supplied to the respective gate lines 14 of the liquid crystal display device 10, and lighting timings of the respective light sources 42r, 42g, 42b of R, G, B. In the figure, G1, G2, . . . Gn respectively denote the gate signals supplied to the respective gate lines 14.

In the field sequential liquid crystal display apparatus, as shown in FIG. 6, the images for one frame are displayed in 1/60 [seconds], the image data is successively supplied in accordance with the speed, and the images of the respective colors R, G, B are displayed for each field of 1/180 [second] obtained by dividing one frame into three.

In FIGS. 5 and 6, the image data for one frame supplied from the outside is supplied to the data conversion section 51, and the image data of the respective colors converted to the respective R, G, B image data are stored as the respective R, G, B image data in the image memory 52 in response to a write signal from the control section 57. For the stored respective color image data, the R image data is read in an R field period of 1/180 second obtained by dividing one frame into three in response to a read signal from the control section 57. Subsequently, the G image data is read out into a G field, and the B image data is successively read out into a B field. The data is sent to the buffer 53. The buffer 53 supplies the R, G, B image data successively read from the image memory 52 as serial image data of the respective colors to the column driver 54 of the liquid crystal display device 10. The column driver 54 generates the data signal to be supplied to each pixel electrode of the liquid crystal display device 10 from the R, G, B image data in response to a control signal from the control section 57, and supplies the data signals to the data lines 15 of the liquid crystal display device 10 for each field.

The row driver 55 generates the gate signal for successively scanning each gate line 14 of the liquid crystal display device 10 for each field in response to the control signal from the control section 57, and supplies the signal to the gate lines 14.

The lighting control section 56 is controlled by the control section 57, and controls the light sources 42*r*, 42*g*, 42*b*, disposed in the lighting apparatus 40, for emitting the respective color lights R, G, B, so that the light source of the color corresponding to each field lights.

As shown in FIG. 6, the liquid crystal display device 10 selects all the gate lines 14 in a first reset period of the R field which is ⅓ of one frame for displaying one image, and supplies reset signals to all the pixel electrodes from the data lines 15. In a subsequent write period, the respective gate lines 14 are successively selected from G1 to Gn, the R data signal of the red color is supplied from the data line 15 in accordance with the selection of the gate line 14, and the data signal is written in each pixel electrode. In a lighting period after the write period in which the data is written in all the pixels, the R light source 42*r* of the red color of the lighting apparatus is lit, and the R image of the red color is displayed.

Next in the G field, similarly as the R field, after the reset signals are first written in all the pixel electrodes in the reset period, the G data signal of the green color is written in each pixel electrode in the write period, subsequently the G light source 42*g* of the green color of the lighting apparatus is lit in the lighting period, and the G image of the green color is displayed.

Similarly, in the B field, after the reset signals are first written in all the pixel electrodes in the reset period, the B data signal of the blue color is written in each pixel electrode in the write period, subsequently the B light source 42*b* of the blue color of the lighting apparatus is lit in the lighting period, and the B image of the blue color is displayed.

When the images corresponding to R, G, B color components are successively displayed in the respective R, G, B color fields, the displays of three fields for the respective R, G, B color components are visually mixed by an after image phenomenon, and the color image of one frame is recognized.

[Second Embodiment]

Figure 7:
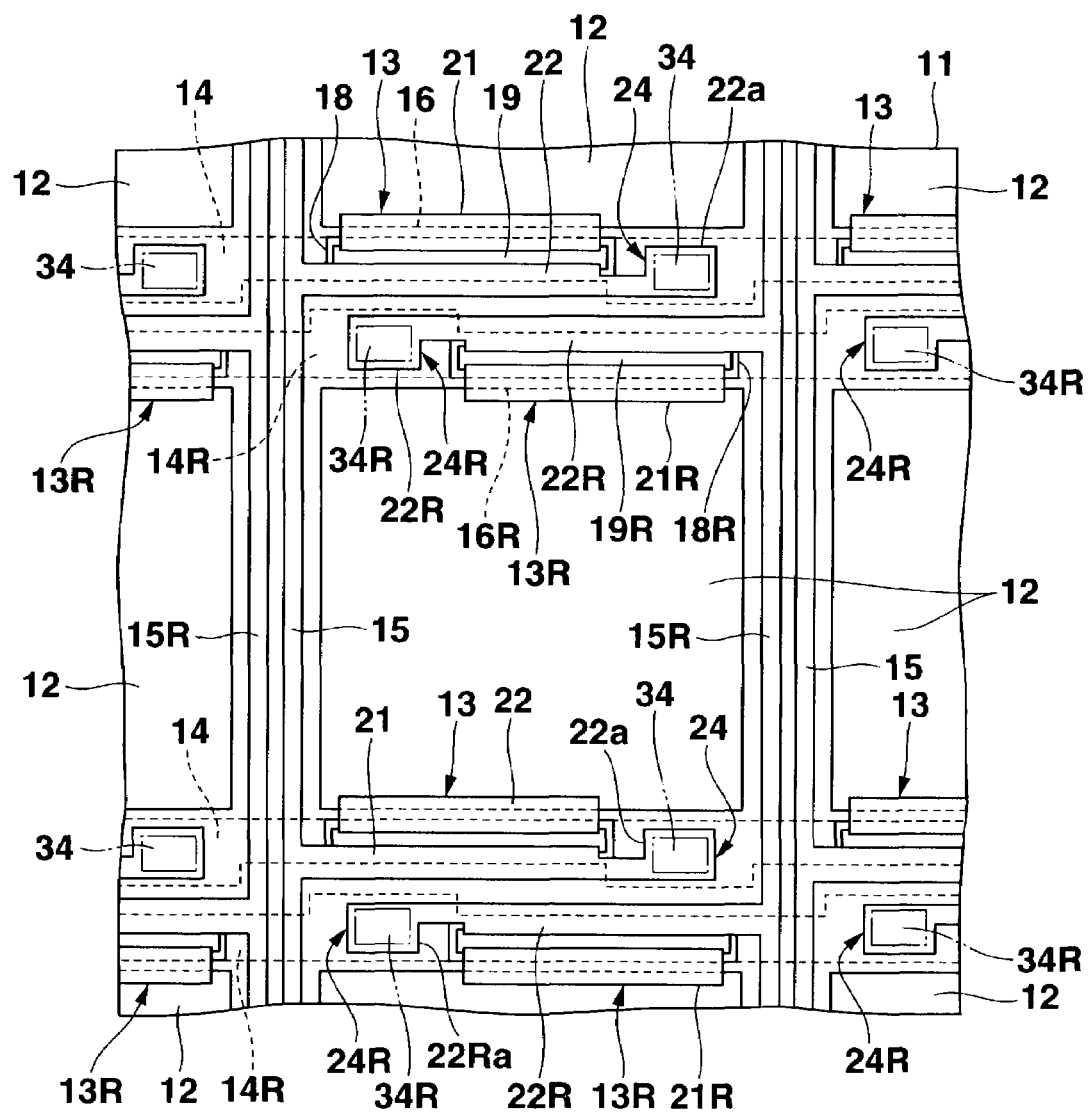
FIG. 7 is an enlarged plan view showing one part of the liquid crystal display device for use in the display apparatus according to a second embodiment of the present invention.

FIG. 7 is a plan view of one part of the first substrate (back substrate) 11 of the liquid crystal display device 10 for use in a second embodiment of the present invention. This liquid crystal display device 10 is also an active matrix liquid crystal display device for use in the field sequential liquid crystal display apparatus.

The liquid crystal display device 10 of the present embodiment includes, a plurality of resetting TFTs 13R which collectively reset write states of all the pixel portions for each field to display one unit color, a plurality of gate lines for resetting 14R which supply the gate signals to the plurality of resetting TFTs 13R, and a plurality of data lines for resetting 15R which supply the read signals to the plurality of resetting TFTs 13R. The TFTs 13R, gate lines 14R, and data lines for resetting 15R are disposed on a side opposite to the TFTs 13, gate lines 14, and data lines for writing 15 with respect to the pixel electrodes 12.

The liquid crystal display device of the present embodiment includes the TFTs 13R, gate lines 14R, and data lines for resetting 15R, but the other constitutions are the same as those of the above-described first embodiment, and are therefore denoted with the same reference numerals in the figure, and redundant description is omitted.

The plurality of resetting TFTs 13R have the same stack structure as the above-described writing TFTs 13 and have a symmetric plane shape, and are formed of stacked films. The stacked film includes a gate electrode 16R formed on the substrate surface of the back substrate 11, the gate insulating film 17 for common use in the writing TFTs 13; an i-type semiconductor film 18R formed opposite to the gate electrode 16R on the gate insulating film 17, a blocking insulating film 19R formed on the middle portion as the channel region of the i-type semiconductor film 18R, source and drain electrodes 21R, 22R formed on opposite sides of the i-type semiconductor film 18R via the n-type semiconductor films 20; and the overcoat insulating film 23 for common use in the writing TFTs 13.

The plurality of gate lines for resetting 14R are formed by the same metal film (aluminum-based alloy film) as that for the gate lines for writing 14 on the substrate surface of the back substrate 11, and the gate electrode 16R of the resetting TFTs 13R is formed integrally with the gate lines for resetting 14R.

In the present embodiment, the portion of the resetting gate line 14 corresponding to each pixel electrode 12 is formed as the gate electrode 16R of the resetting TFT 13R. Moreover, the i-type semiconductor film 18R, n-type semiconductor films 20R, and source and drain electrodes 21R, 22R are formed to be long along a length direction of the resetting gate line 14R. Thereby, the resetting TFT 13R is formed as a TFT having a large channel width similarly as the resetting TFT 13.

The plurality of data lines for resetting 15R are formed by the same metal film (stacked films of the chromium film and the aluminum-based alloy film formed on the chromium film) as the metal film for the source and drain electrodes 21, 21R, 22, 22R of the writing TFTs and resetting TFTs 13, 13R on the gate insulating film 17. The drain electrode 22R of the resetting TFT 13R is formed integrally with the data line for resetting 15R, and the source electrode 21R of the TFT for resetting 13R is connected to the edge of the pixel electrode 12 on a side opposite to the edge connected to the source electrode 21 of the resetting TFT 13.

In the present embodiment, on the inner surface of the back substrate 11, beside the plurality of writing TFTs and resetting TFTs 13, 13R, a plurality of spacer support portions 24R formed of stacked films forming the writing TFTs and resetting TFTs 13, 13R excluding the i-type semiconductor film 18R, blocking insulating film 19R, and n-type semiconductor films 20 are arranged at the same pitch as the arrangement pitch of the writing TFTs and resetting TFTs 13, 13R.

In the present embodiment, the spacer support portions 24 beside the writing TFTs 13 and the spacer support portions 24R beside the resetting TFTs 13R are formed by the gate lines for writing and resetting 14, 14R, gate insulating film 17, extended electrodes 22a, 22Ra extended to portions on the gate lines for writing and resetting 14, 14R from the drain electrodes 22 of the writing TFTs and resetting TFTs 13, 13R, and overcoat insulating film 23.

In the present invention, the writing TFTs 13 are disposed in the vicinity of the data lines for writing 15 with respect to the pixel electrodes 12, and the resetting TFTs 13R are disposed in the vicinity of the data lines for resetting 15R. Thereby, the spacer support portions 24 beside the writing TFTs 13 are disposed in regions between the writing TFTs 13 and data lines for resetting 15R, and the spacer support portions 24R beside the resetting TFTs 13R are disposed in regions between the resetting TFTs 13R and data lines for writing 15. On the inner surface (on the stacked films of the shield film 33 and opposed electrode 32) of the front substrate 31 shown in FIGS. 3 and 4, the columnar spacers 34, 34R having the same height are disposed opposite to the spacer support portions 24, 24R disposed beside the writing TFTs and resetting TFTs 13, 13R. These columnar spacers 34R are allowed to abut on the alignment film 25 surface on the plurality of spacer support portions 24R disposed on the inner surface of the back substrate 11 via the alignment film 35 with which the columnar spacers 34R are coated, so that the substrate gap $d_0$ is defined.

The liquid crystal display device of the present embodiment includes the TFTs 13R, gate lines 14R, and data lines 15R for resetting. On the inner surface of the back substrate 11, the spacer support portions 24, 24R are disposed beside the writing TFTs and resetting TFTs 13, 13R. Moreover, on the inner surface of the front substrate 31, the columnar spacers 34, 34R are disposed opposite to the spacer support portions 24, 24R. The gap $d_0$ can be defined by the number of columnar spacers 34, 34R which is double the number of columnar spacers of the first embodiment.

Also in the present embodiment, on the inner surface of the back substrate 11 excluding the pixel electrodes 12 and writing TFTs and resetting TFTs 13, 13R, the plurality of spacer support portions 24, 24R of the stacked films forming the TFTs 13, 13R other than the i-type semiconductor films 18, 18R, blocking insulating films 19, 19R, and n-type semiconductor films 20, 20R are arranged at the predetermined pitches (the same pitches as the arrangement pitches of the TFTs 13, 13R for writing and resetting in the present embodiment). On the inner surface of the front substrate 31, the plurality of columnar spacers 34, 34R for defining the gap of the pair of substrates 11, 31 are disposed opposite to the plurality of spacer support portions 24, 24R. Therefore, similarly as the liquid crystal display device of the first embodiment, even when the heights of the columnar spacers 34, 34R are not excessively reduced, the gap $d_0$ defined by the columnar spacers 34, 34R is reduced. Moreover, the liquid crystal layer thickness d of the plurality of pixel portions in which the plurality of pixel electrodes 12 are disposed opposite to the opposed electrode 32 can be reduced.

In the second embodiment, there are disposed the resetting TFTs 13R for resetting the respective pixels which constitute the liquid crystal display device. Therefore, all the gate lines 14R of the resetting TFTs 13R are selected in the respective first reset periods of three fields to display one image, and the reset signals are supplied to all the pixel electrodes from the data lines for resetting 15R. Subsequently, the data signal is written for each color field. That is, in the R field, the selection signals are supplied to all the gate lines for resetting 14R, all the resetting TFTs 13R are turned on and selected, and the reset signals are supplied to all the pixel electrodes from the data lines for resetting 15R. Next in the write period, the respective gate lines 14 are successively selected from G1 to Gn, the R data signal of the red color is supplied from the data line 15 in accordance with the selection of the gate line 14, and the data signal is written in each pixel electrode. In the lighting period after the write period in which the data is written in all the pixels, the R light source 42r of the red color of the lighting apparatus is lit, and the R image of the red color is displayed.

Next in the G field, similarly as the R field, after the reset signals are first written in all the pixel electrodes in the reset period via the resetting TFTs 13R, the G data signal of the green color is written in each pixel electrode in the write period, subsequently the G light source 42g of the green color of the lighting apparatus is lit in the lighting period, and the G image of the green color is displayed.

Similarly, in the B field, after the reset signals are first written in all the pixel electrodes via the resetting TFTs 13R in the reset period, the B data signal of the blue color is next written in each pixel electrode in the write period, subsequently the B light source 42b of the blue color of the lighting apparatus is lit in the lighting period, and the B image of the blue color is displayed.

When the images corresponding to R, G, B color components are successively displayed in the respective R, G, B color fields, the displays of three fields for the respective R, G, B color components are visually mixed by the after image phenomenon, and the color image of one frame is visually recognized.

In the first and second embodiments, the columnar spacers 34, 34R are disposed on the inner surface of the front substrate 31. Alternatively, the columnar spacers 34, 34R may be disposed on the plurality of spacer support portions 24, 24R on the inner surface of the back substrate 11, and are allowed to abut on the inner surface of the front substrate 31, so that the gap $d_0$ may be defined.

Moreover, the liquid crystal display device according to the above-described embodiments is a homogeneous alignment type liquid crystal display device in which the liquid crystal molecules are homogeneously aligned in one direction. However, the present invention can also be applied to a twisted nematic (TN) liquid crystal display device in which the liquid crystal molecules are aligned in a twisted manner, or ferroelectric or antiferroelectric liquid crystal display device. Moreover, the present invention can be applied to not only the liquid crystal display device of the field sequential liquid crystal display apparatus but also the liquid crystal display device of a liquid crystal display apparatus in which a monochromatic image is displayed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display apparatus comprising:
   (a) a liquid crystal display device including:
      a pair of substrates disposed opposite to each other,
      at least one common electrode formed on an inner surface of a first substrate of said pair of substrates disposed opposite to each other, a plurality of pixel electrodes which are formed on an inner surface of a second substrate of said pair of substrates disposed opposite to each other, in which regions disposed opposite to said common electrode form pixel regions, a plurality of active devices which are disposed corresponding to said plurality of pixel electrodes on the inner surface of said second substrate, each of said active devices comprising a drain electrode and a source electrode, and each of said active devices being driven by gate signals supplied via gate lines provided between adjacent pixel regions to supply data signals via data lines provided between the adjacent pixel regions and connected to the active devices via the source and drain electrodes, a plurality of extended electrodes, each of which extends from one of the source electrode and the drain electrode of a respective one of the active devices, a liquid crystal layer disposed between said pair of substrates, said liquid crystal layer including a liquid crystal having a homogenous alignment in which molecule long axes of liquid crystal molecules are aligned in one direction and the liquid crystal molecules are arranged without being twisted between said pair of substrates, and a plurality of columnar spacers which are formed by patterning a resin film on one of the inner surfaces of said pair of substrates disposed opposite to each other in respective regions corresponding to the extended electrodes, such that the columnar spacers are juxtaposed with the active devices to determine a thickness of the liquid crystal layer between said pair of substrates, said regions corresponding to the extended electrodes being different from the pixel regions and regions with the active devices formed therein, wherein transmission of light through said pixel regions is controlled in accordance with a voltage applied between said pixel electrodes and said common electrode without means for coloring the light passing through the respective pixel regions;

(b) a light source which is disposed on a side opposite to an observation side of said liquid crystal display device and which selectively generates lights of a plurality of different colors and emits the lights to said respective pixel regions; and (c) a control device which (i) supplies a data signal corresponding to image data of one color corresponding to one of the colors generated by said light source onto said pixel electrodes from said active devices, (ii) applies a voltage corresponding to said image data of the one color between the respective pixel electrodes and the common electrode of said liquid crystal display device, thereby controlling the light transmission through the respective pixel regions of said liquid crystal display device, (iii) allows said light source to generate the light of the one color of said image data and to emit the lights to the respective pixel regions of said liquid crystal display device, and (iv) thereby displays an image of the one color by the pixel regions.

2. The liquid crystal display apparatus according to claim 1, wherein the thickness of the liquid crystal layer ranges from 1.475 to 2.2 μm.

3. The liquid crystal display apparatus according to claim 1, wherein said columnar spacers disposed between the pair of substrates of said liquid crystal display device comprise a photosensitive resin and are formed by patterning a photosensitive resin film on one of the inner surfaces of said pair of substrates disposed opposite to each other by a photolithography process.

4. The liquid crystal display apparatus according to claim 1, wherein said columnar spacers are formed on the inner surface of the second substrate.

5. The liquid crystal display apparatus according to claim 1, wherein said columnar spacers are formed on said inner surface of the first substrate.

6. The liquid crystal display apparatus accQrdiflg to claim 5, further comprising:

a shield film which is formed on the inner surface of the first substrate and which shields the regions other than said pixel regions, wherein said columnar spacers are formed on said shield film and the common electrode on the inner surface of the first substrate.

7. The liquid crystal display apparatus according to claim 1, wherein said columnar spacers have one-to-one correspondence with said active devices.

8. The liquid crystal display apparatus according to claim 1, further comprising:

spacer support portions which protrude from portions of a substrate without columnar spacers that are disposed opposite to said columnar spacers, and against which said columnar spacers abut.

9. The liquid crystal display apparatus according to claim 8, wherein said columnar spacers are formed on the inner surface of the first substrate, and wherein each of said spacer support portions comprise stacked films including a gate insulating film of the active device, an extended electrode portion extended from one of source and drain electrodes, and an overcoat film with which said active device is coated on the inner surface of the second substrate.

10. The liquid crystal display apparatus according to claim 9, wherein each of said spacer support portions comprises the stacked films of the active device excluding an i-Si film, an —Si film, and a blocking layer of the active device.

11. The liquid crystal display apparatus according to claim 8, wherein the thickness of the liquid crystal layer ranges from 1.475 to 2.2 μm.

12. A liquid crystal display apparatus comprising:
(a) a liquid crystal display device including:
first and second substrates which have inner surfaces disposed opposite to each other and which are disposed opposite to each other, at least one common electrode formed on the inner surface of said first substrate, a plurality of pixel electrodes which are formed on the inner surface of said second substrate and in which regions disposed opposite to said common electrode form pixel regions, a plurality of active devices which are disposed corresponding to said plurality of pixel electrodes on the inner surface of said second substrate, each of said active devices comprising a drain electrode and a source electrode, and each of said active devices being driven by gate signals supplied via gate lines provided between adjacent pixel regions to supply data signals via data lines provided between the adjacent pixel regions and connected to the active devices via the source and drain electrodes, a plurality of extended electrodes, each of which extends from one of the source electrode and the drain electrode of a respective one of the active devices.

a liquid crystal layer disposed between said first and second substrates, which includes a liquid crystal having a homogenous alignment in which molecule long axes of liquid crystal molecules are aligned in one direction, and the liquid crystal molecules are arranged without being twisted between said first and second substrates, a plurality of columnar spacers which are formed by patterning a resin film on one of the inner surfaces of said first and second substrates in respective regions corresponding to the extended electrodes, such that the columnar spacers are juxtaposed with the active devices to determine a thickness of the liquid crystal layer between said first and second substrates, said regions corresponding to the extended electrodes being different from the nixel regions and regions with the active devices formed therein, and a plurality of spacer support portions which are formed to protrude from the inner surface of said second substrate in portions disposed opposite to said columnar spacers and against which said plurality of columnar spacers abut, each of said plurality of spacer support portions comprising a laminated structure including one of the extended electrodes and one of the gate lines;

wherein transmission of light through said respective pixel regions is controlled in accordance with a voltage applied between said pixel electrodes and said common electrode without means for coloring light passing through the respective pixel regions;

(b) a light source which is disposed on a side opposite to an observation side of said liquid crystal display device and which selectively generates lights of a plurality of different colors and emits the lights to said respective pixel regions; and (c) a driving device which (i) supplies a data signal corresponding to image data of one color corresponding to one of the plurality of colors generated by said light source onto said pixel electrodes via said active devices, (ii) applies a voltage corresponding to said image data of the one color between the respective pixel electrodes and the common electrode of said liquid crystal display device, thereby controlling the light transmission through the respective pixel regions of said liquid crystal display device, (iii) allows said light source to generate the light of the one color of said image data and to emit the light to the respective pixel regions of said liquid crystal display device, and thereby (iv) displays an image of the one color by the pixel regions.

13. The liquid crystal display apparatus according to claim 12, wherein the thickness of the liquid crystal layer of said liquid crystal display device ranges from 1.475 to 2.2 μm.

14. The liquid crystal display apparatus according to claim 13, wherein each of said spacer support portions comprises stacked films including a gate insulating film of the active device, an extended electrode portion extended from one of source and drain electrodes, and an overcoat film with which said active device is coated on the inner surface of said second substrate.

15. A liquid crystal display apparatus comprising:
(a) a liquid crystal display device including:
first and second substrates which have inner surfaces disposed opposite to each other and which are disposed opposite to each other,
at least one common electrode formed on the inner surface of said first substrate,
a plurality of pixel electrodes which are formed on the inner surface of said second substrate and in which regions disposed opposite to said common electrode form pixel regions,
a plurality of writing active devices which are disposed opposite to said plurality of pixel electrodes on the inner surface of said second substrate and which supply data signals corresponding to image data to said pixel electrodes,
a plurality of resetting active devices which are disposed corresponding to said plurality of pixel electrodes on the inner surface of said second substrate and which supply reset signals to said pixel electrodes,
a liquid crystal layer disposed between said first and second substrates,
a plurality of columnar spacers which are formed by patterning a resin film on any one of the inner surfaces of said first and second substrates and which determine a thickness of the liquid crystal layer between said first and second substrates, and
a plurality of spacer support portions which are formed to protrude from the inner surface of said second substrate in portions disposed opposite to said columnar spacers and on which said columnar spacers abut, so that transmission of light through said respective pixel regions is controlled in accordance with a voltage applied between said pixel electrodes and common electrode;
(b) a light source which is disposed on a side opposite to an observation side of said liquid crystal display device and which selectively generates lights of a plurality of different colors and emits the lights to said respective pixel regions; and
(c) a driving device which supplies the reset signals to said pixel electrodes from said resetting active devices, thereby applying a reset voltage between said respective pixel electrodes and common electrode of said liquid crystal display device, subsequently supplies the data signal corresponding to the image data of one color corresponding to one of the colors generated by said light source from said writing active devices, thereby applies a write voltage between said respective pixel electrodes and common electrode, thereby controlling the light transmission through said respective pixel regions of said liquid crystal display device, the driving device allowing said light source to generate the light of the color of said image data and to emit the lights to the respective pixel regions of said liquid crystal display device.

16. The liquid crystal display apparatus according to claim 15, wherein said spacer support portions are disposed beside said writing active devices and beside said resetting active devices on the inner surface of said second substrate, and said columnar spacers are disposed in positions disposed opposite to said spacer support portions between said first and second substrates.

* * * * *